US009298274B2

(12) United States Patent
Yoshida et al.

(10) Patent No.: US 9,298,274 B2
(45) Date of Patent: Mar. 29, 2016

(54) STRING PREDICTIONS FROM BUFFER

(75) Inventors: Taketoshi Yoshida, Shibuya (JP); Jerome Turner, Kobe (JP); Songming Ho, Yokohama (JP); Kazuhide Oigo, Yamato (JP)

(73) Assignee: Microsoft Technology Licensing, LLC, Redmond, WA (US)

(*) Notice: Subject to any disclaimer, the term of this patent is extended or adjusted under 35 U.S.C. 154(b) by 781 days.

(21) Appl. No.: 13/553,815

(22) Filed: Jul. 20, 2012

(65) Prior Publication Data

US 2014/0025616 A1 Jan. 23, 2014

(51) Int. Cl.
*G06F 3/02* (2006.01)
*G06F 15/18* (2006.01)
*G06N 99/00* (2010.01)
*G06F 3/023* (2006.01)

(52) U.S. Cl.
CPC .............. *G06F 3/023* (2013.01); *G06F 3/0237* (2013.01); *G06N 99/005* (2013.01)

(58) Field of Classification Search
None
See application file for complete search history.

(56) References Cited

U.S. PATENT DOCUMENTS

| 5,748,512 | A | 5/1998 | Vargas | |
|---|---|---|---|---|
| 7,912,700 | B2 | 3/2011 | Bower et al. | |
| 2006/0217965 | A1* | 9/2006 | Babu | 704/9 |
| 2006/0244729 | A1* | 11/2006 | Vander Veen | 345/169 |
| 2007/0005336 | A1* | 1/2007 | Pathiyal et al. | 704/2 |
| 2008/0126075 | A1 | 5/2008 | Thorn | |
| 2008/0167858 | A1* | 7/2008 | Christie et al. | 704/10 |
| 2008/0195388 | A1 | 8/2008 | Bower et al. | |
| 2008/0243737 | A1* | 10/2008 | Rieman et al. | 706/18 |
| 2010/0070921 | A1* | 3/2010 | Rieman et al. | 715/811 |
| 2010/0131447 | A1 | 5/2010 | Creutz et al. | |
| 2010/0169441 | A1* | 7/2010 | Lafleur et al. | 709/206 |
| 2011/0029862 | A1 | 2/2011 | Scott et al. | |
| 2011/0201387 | A1 | 8/2011 | Paek et al. | |
| 2012/0197825 | A1* | 8/2012 | Medlock et al. | 706/11 |
| 2013/0041857 | A1* | 2/2013 | Medlock et al. | 706/14 |
| 2013/0166280 | A1* | 6/2013 | Quast et al. | 704/9 |
| 2013/0289976 | A1* | 10/2013 | Walker et al. | 704/9 |
| 2014/0108994 | A1* | 4/2014 | Medlock et al. | 715/773 |

OTHER PUBLICATIONS

Darragh et al, The Reactive Keyboard: A Predictive Typing Aid, 1989.*
Tanenhaus, Joan, "Apple iPad and iPad2 for Special Needs—Part II", Retrieved at <<http://www.ablenetinc.com/portals/0/pdfs/CTG-Article-Diskoveries.pdf>> Jun. 2011, pp. 14-23.

(Continued)

*Primary Examiner* — Stanley K Hill
*Assistant Examiner* — Mikayla Chubb
(74) *Attorney, Agent, or Firm* — Judy Yee; Micky Minhas (57) ABSTRACT

In a mobile device, the strings that make up a current thread in application are stored in a buffer. A thread is a series of communications sent between a user of the mobile device and one or more other users, such as a series of text messages or a series of emails. When the user enters text to continue the current thread, characters of the entered text are compared against the strings stored in the buffer, and strings that have the entered text as a prefix are selected and displayed to the user as string predictions in a soft input panel. Alternatively, the strings in the buffer may be used to increase the probabilities of matching strings in a dictionary or model that is used to select string predictions.

20 Claims, 5 Drawing Sheets

(56) References Cited

OTHER PUBLICATIONS

Biba, Paul, "Improv™: New Augmentative Communication Software Gives AAC Users Opportunities for Conversations", Retrieved at <<http://www.teleread.com/paul-biba/improv%E2%84%A2-new-augmentative-communication-software-gives-aac-users-opportunities-for-conversations/>> Jan. 25, 2012, pp. 7.

Arakawa, et al., "Relationship Analysis between User's Contexts and Real Input Words through Twitter", Retrieved at <<http://ieeexplore.ieee.org/stamp/stamp.jsp?tp=&arnumber=5700241>> Proceedings: IEEE GLOBECOM Workshops (GC Wkshps), Dec. 10, 2010, pp. 1751-1755.

"International Search Report", Mailed Nov. 7, 2013, Application No. PCT/US2013/051178, Filed Date Jul. 19, 2013, pp. 1-10.

"Office Action Issued in European Patent Application No. 13745931.9", Mailed Date: Jun. 8, 2015, 5 Pages.

* cited by examiner

STRING PREDICTIONS FROM BUFFER

BACKGROUND

Typing is part of many scenarios on a mobile device including writing a text message, writing an email, searching for a contact, and typing a URL (uniform resource locator), for example. Typing on a mobile device can be slow and frustrating. This can be especially true when using an on-screen software keyboard.

One solution to this problem is known as a soft input panel. In a soft input panel, a region of the screen displays suggested word predictions based on the characters that a user has entered so far into a text input field. The suggested words change as the user continues to enter characters into the field. When the user sees a word prediction that matches the word that he is entering, the user may select the word prediction and the selected word is placed in the text input field as a replacement for the characters entered by the user.

Typically, the word predictions shown to the user are generated by matching the entered characters against words in a dictionary, and then presenting a ranked subset of the matching words based on a likelihood that each word is the word that the user intends to enter. The likelihood may be based on the overall frequency of usage of each matching word by the general population.

One drawback to such a method for providing word predictions is that it fails to take into account the words or phrases currently or recently used by the user, or other users, when selecting the word predictions, or when ranking the word predictions. For example, a user may be having a short message service (SMS) or email conversation with another user about a recent trip to Texas. When a user enters the character "t" into the text input field, the user may be provided word predictions such as "the", "their", and "there" because they begin with "t" and are high frequency words in the English language. The word prediction "Texas" is not provided to the user because it either does not match an entry in the dictionary, or it is not ranked highly enough, even though it is likely given the contents of the conversation so far.

SUMMARY

In a mobile device, the strings that make up a current thread in an application are stored in a buffer. A thread is a series of communications sent between a user of the mobile device and one or more other users, such as a series of text messages or a series of emails. When the user enters text to continue the current thread, characters of the entered text are compared against the strings stored in the buffer, and strings that have the entered text as a prefix are selected and displayed to the user as string predictions in a soft input panel. Alternatively, the strings in the buffer may be used to increase the probabilities of matching or semantically related strings in a dictionary or model that is used to select string predictions.

In an implementation, strings are stored by a computing device. The strings are associated with a thread in a first application. A first character is received by the computing device. The received character is associated with the thread in the first application. A first plurality of string predictions is generated based on the received first character and the stored strings. Each string prediction comprises a string from the stored strings. One or more of the strings of the first plurality of string predictions are provided by the computing device. An indication of selection of one of the provided one or more strings is received by the computing device. In response to the indication of selection, the selected string is provided to the first application as part of the thread by the first computing device.

In an implementation, a first plurality of strings is retrieved. The plurality of strings is associated with a thread. A dictionary is retrieved. The dictionary comprises a second plurality of strings, and each string has an associated probability. One or more strings from the second plurality of strings that is also in the first plurality of strings are determined by the computing device. For each determined string, the probability associated with the string in the dictionary is increased. A character is received by the computing device. The received character is associated with the thread. One or more strings from the dictionary are selected based on the received character and the probability associated with each of the strings in the dictionary. The selected one or more strings from the dictionary are displayed on a display of the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
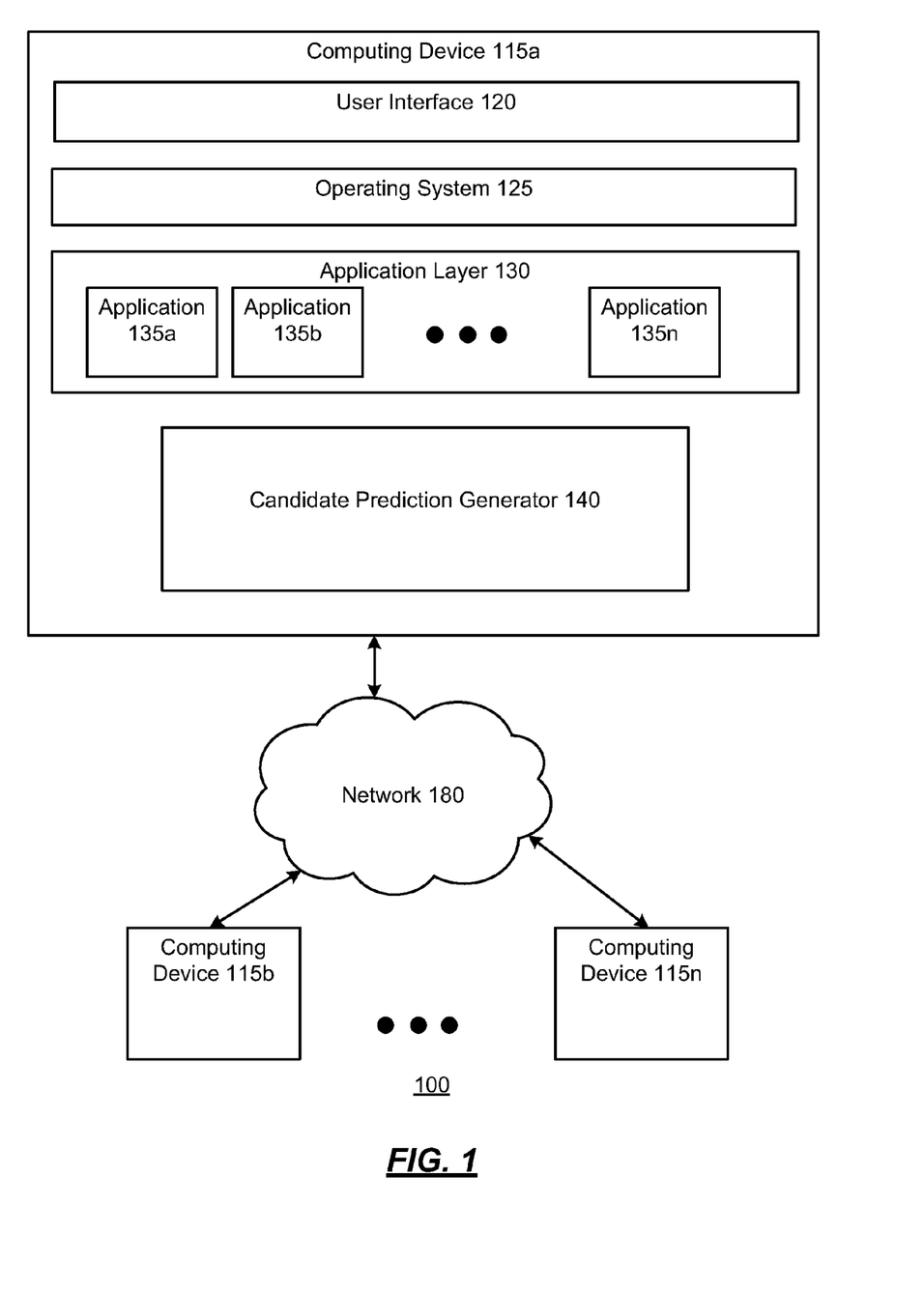
FIG. 1 is an illustration of an example environment for the selection and presentation of string predictions.

FIG. 1 is an illustration of an example environment 100 for the selection and presentation of string predictions. The environment 100 may include a plurality of computing devices 115 (e.g., computing devices 115a-n). The computing devices 115 may be a variety of computing devices including mobile devices such as cell phones, smart phones, portable media players, game consoles, and the like. The computing devices 115 may communicate with one another through a network 180. The network 180 may be a variety of network types including the public switched telephone network (PSTN), a cellular telephone network, and a packet switched network (e.g., the Internet). Examples of suitable computing devices 115 include the computing system 500 described with respect to FIG. 5.

Each of the computing devices 115 may include an operating system 125 and a user interface 120. The operating system 125 may include a variety of well known operating systems. A user of the computing device may use the user interface 120 to input one or more characters to the operating system 125. The user interface 120 may include a variety of interfaces including a software keyboard or a hardware keyboard, for example.

Each of the computing devices 115 may further execute one or more applications 135 (e.g., applications 135a-n). The applications 135 may be executed in an application layer 130. The applications 135 may include email applications, short message service (SMS) or text applications, chat applications, social networking applications, and word processing applications, for example. The computing devices 115 may exchange text-based messages using the applications 135. For example, each computing device may execute an SMS application and may send and receive SMS messages through the application.

The users of the computing devices 115 may interact with the applications 135 through the user interface 120 and the operating system 125. In an implementation, a user may enter characters through a soft input panel of the user interface 120. The entered characters may be received by the operating system 125, and may be provided to one or more of the applications 135.

As described above, the process of entering text character by character into the user interface 120 may be frustrating for users of the computing devices 115. Accordingly, the computing device 115 may further include a candidate prediction generator 140. The candidate prediction generator 140 may generate one or more string predictions. A string prediction may include a string that the candidate prediction generator 140 predicts that a user intends to enter into the user interface 120. The string prediction may further include a confidence value for the string. The predicted string may include any sequence of one or more characters including, but not limited to, words, phrases, sentences, emoticons, punctuation marks or other symbols, or combinations thereof.

Figure 2:
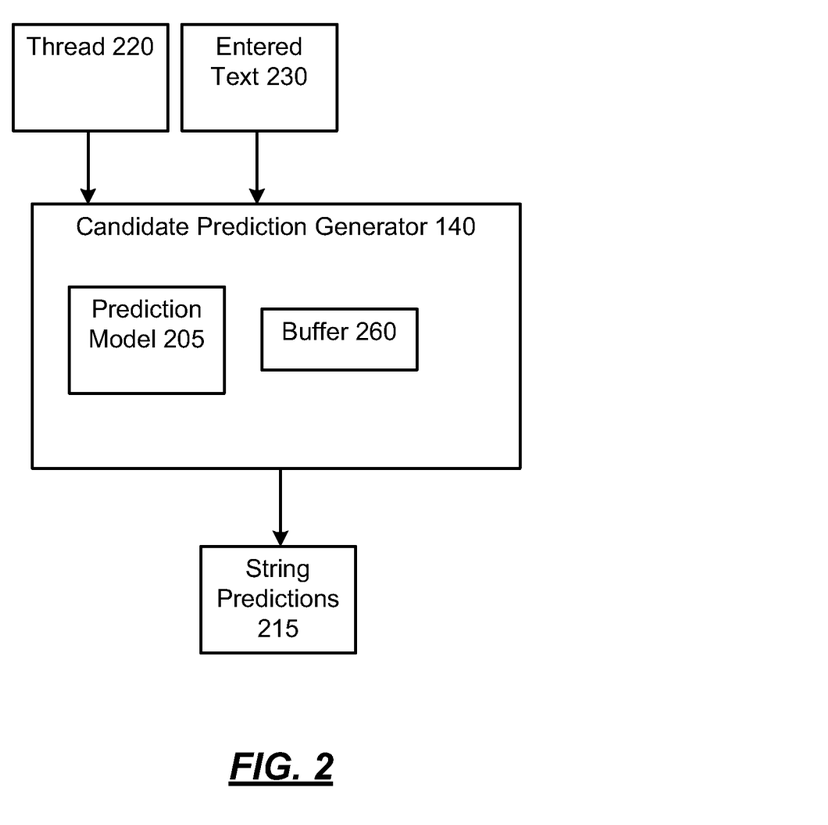
FIG. 2 is an illustration of an example candidate prediction generator.

As described further with respect to FIG. 2, the string predictions may be based in part on the strings associated with a thread of one or more of the applications 135. A thread as used herein may refer to a series of related communications between two or more users through a particular application. For example, a group of friends may have a conversation over email, SMS, or through a social networking application. The SMS messages, emails, or social networking messages sent back and forth as part of the conversation may be considered a thread. The strings associated with the thread may be the text from the emails, SMS, or social networking application messages that make up the thread, for example.

In some implementations, when the user loads or begins to use one of the applications 135, the candidate prediction generator 140 may load or retrieve the strings from a current thread associated with the application. As the user continues the thread by entering one or more characters, the strings of the thread may be used by the candidate prediction generator 140 to provide one or more string predictions based on the entered characters. The strings of the string predictions may be strings that were used in the current thread, and the confidence values of the string predictions may be based on the frequency of the strings in the thread.

By generating string predictions based on the words and phrases used in a current thread, rather than solely based on a dictionary or model, the generated string predictions are not limited to the words and phrases used in the dictionary or model. Moreover, by basing the confidence value of a generated string prediction on the frequencies of the associated string in the current thread rather than on the frequency or probability of the string in general usage, the confidence value may more accurately represent the likelihood that the user intends to enter the string of the string prediction.

FIG. 2 is an illustration of an example candidate prediction generator 140. As shown, the candidate prediction generator 140 may include several components, including but not limited to, a buffer 260 and a prediction model 205. Some or all of the components of the candidate prediction generator 140 may be implemented by a computing system 500 illustrated in FIG. 5.

The candidate prediction generator 140 may receive an indication of a current application 135 from the operating system 125. For example, a user of one of the computing devices 115 may execute, or switch to, an application 135 such as an email or SMS application.

In response to the indication, the candidate prediction generator 140 may retrieve a thread 220 associated with the application 135. The thread 220 may comprise the current thread 220 of the application 135, and may be retrieved directly from the application 135, or may be retrieved from storage by the candidate prediction generator 140. For example, the candidate prediction generator 140 may store a current thread 220 for a variety of applications 135.

The candidate prediction generator 140 may extract strings from the retrieved thread, and place the extracted strings in the buffer 260. The candidate prediction generator 140 may use the strings in the buffer 260 to generate one or more string predictions 215. The confidence value associated with a string prediction may be based on the frequency of the string in the buffer 260 associated with the string prediction.

The candidate prediction generator 140 may receive entered text 230 associated with the current thread 220. The entered text 230 may comprise one or more characters and may be received from a user associated with the computing device 115. The entered text 230 may be entered by the user into a user interface element of the user interface 120 such as a text box, for example. The entered text 230 may be part of a string that the user intends to provide to the application 135 as part of the thread 220.

The candidate prediction generator 140 may use the entered text 230 and the contents of the buffer 260 to generate one or more string predictions 215. In some implementations, the string predictions 215 may be generated by the candidate prediction generator 140 by determining strings from the buffer 260 that have the entered text 230 as a prefix. The confidence values for the determined strings may be determined based on the frequency of the strings in the buffer 260, for example. In general, the more times that a string appears in the buffer 260, the greater the determined confidence value may be. The candidate prediction generator 140 may further multiply the confidence values for each string by a scaling factor associated with the buffer 260. As described further below, the scaling factor may be used to compare string generated from the buffer 260 and strings generated using one or more prediction models 205.

In some implementations, the candidate prediction generator 140 may update the contents of the buffer 260 to reflect any newly received strings even as the user continues to provide entered text 230. For example, while a user is entering characters in an SMS application, a new text message may be received for the thread 220. Any strings from the newly received text message may be added to the buffer 260 and may be used to generate strings in response to the entered text 230.

The candidate prediction generator 140 may provide one or more of the generated string predictions 215. Where there are many string predictions 215, the candidate prediction generator 140 may select which string predictions 215 to provide based the confidence values associated with each string prediction 215. The strings of the provided string predictions 215 may be displayed to the user in a soft input panel of the user interface 120, or other user interface element, for example. If the user selects a displayed string, the string may be provided as an input to the application 135, and the selected string may become part of the thread 220. Accordingly, the candidate prediction generator 140 may add the selected string to the strings in the buffer 260.

In some implementations, in addition to the buffer 260, the candidate string generator 140 may also generate one or more string predictions 215 using a prediction model 205. The prediction model 205 may comprise a dictionary, and may include a variety of strings (e.g., words or phrases), along with a probability for each string. The probability of each string may reflect the popularity of each string in general usage, for example. The probabilities may have been determined by collecting and analyzing the strings provided by users over a period of time for one or more applications 135 in one or more threads 220, or may be based on an analysis of strings from newspapers, magazines, or other language sources. Other types of models may be used. There may be several prediction models 205. For example, one model may be a dictionary as described above, and another model may be based on the strings that the user has entered and the frequency of the entered strings. Similarly as described for the buffer 260, each prediction model 205 may have a scaling factor that is indicative of its overall importance.

In an implementation, the candidate prediction generator 140 may use the prediction model(s) 205 to generate string predictions 215 based on the entered text 230, by determining strings from the model(s) 205 that have the entered text 230 as a prefix. The confidence values for the determined strings may be determined based on the probability associated with each string in the particular model 205. The candidate prediction generator 140, for each prediction model 205, may further multiply the confidence value of the generated strings for the prediction model 205 by the scaling factor associated with the prediction model 205.

In some implementations, the candidate string generator 140 may combine the string predictions generated using the buffer 260 with the string predictions generated by the prediction model(s) 205. For example, the candidate string generator 140 may select the top string predictions (i.e., with the highest confidence values adjusted by the scaling factor) of the buffer 260 and the top string predictions of the prediction model(s) 205, and may combine the selected string predictions.

In other implementations, the candidate string generator 140 may use the strings in the buffer 260 (i.e., the strings of the current thread 220) to adjust or weight the probabilities of the strings generated by the prediction model(s) 205. The candidate string generator 140 may determine strings of the prediction model(s) 205 that are also in the buffer 260. The candidate string generator 140 may increase the probabilities of the determined strings in the prediction model 205. The amount that the probability of a string is increased in the prediction model 205 may depend on the frequency of the string in the buffer 260. By increasing the probability of a string in the prediction model(s) 205, the likelihood that a string prediction that includes the string is provided by the candidate string generator 140 is increased. Strings from the buffer 260 that are not in the prediction model(s) 205 may be added to the prediction model(s) 205 by the candidate string generator 140.

In some implementations, the candidate string generator 140 may also increase the probability of strings in the prediction model(s) 205 that are semantically related to the strings in the buffer 260. For example, if the buffer includes the string "New York", the candidate string generator 140 may increase the probability of related strings in the prediction model(s) 205 such as "Broadway", "Empire State Building", and "Grand Central Station", even where those strings do not appear in the buffer 260.

Depending on the implementation, the adjustments made to the probabilities in the prediction model(s) 205, or any strings added to the prediction model(s) 205, may be temporary or permanent. For temporary adjustments, the candidate prediction generator 140 may undo the adjustments made to the prediction model(s) 205 when the application 135 closes or a different thread 220 is continued or started.

For example, the candidate prediction generator 140 may detect or receive an indication from the operating system 125 that the user has switched applications 135. Before retrieving a thread 220 associated with the new application 135, the candidate prediction generator 140 may undo the adjustments made to the probabilities of the prediction model(s) 205, or may load a new unadjusted copy of the prediction model(s) 205.

In some implementations, rather than adjust the probabilities of the prediction model(s) 205, the candidate prediction generator 140 may adjust the confidence values of the string predictions 215 generated using the prediction model(s) 205 based on the strings in the buffer 240. When the candidate prediction generator 140 generates a set of string predictions 215 based on the entered text 230 using the prediction model(s) 205, the candidate prediction generator 140 may determine the strings of the generated string predictions 215 that are also in the buffer 260. The string predictions 215 with strings that are also in the buffer 260 may have their associated confidence value adjusted or increased, or may be selected to be displayed to the user regardless of their associated confidence value.

The candidate prediction generator 140 may determine that the current thread 220 or the current application 135 is no longer active, and in response to the determination, may clear the buffer 260. For example, a user may have closed the application 135 associated with the current thread, or may have started a new thread 220. By clearing the buffer 260, the strings of the previous thread 220 may no longer be used to generate string predictions 215 based on entered text 230. Clearing the buffer 260 may help prevent an irrelevant string from being included in the string predictions 215, and may also alleviate privacy concerns associated with leaving the strings in the buffer 260.

Alternatively or additionally, rather than immediately clear the buffer 260, the candidate prediction generator 140 may allow some or all of the strings to remain in the buffer 260, even where the user creates a new thread 220, continues an existing thread 220, or switches applications 135. As may be appreciated, even after ending a thread 220 (i.e., conversation), a user may still be likely to provide one or more of the strings used in the thread 220. For example, a user may use an email application 135 to continue an email conversation about planning a trip to Barcelona. After closing the email application 135, the user may use a web browsing application 135 to search for Barcelona attractions, or may use an SMS application 135 to send a text message about Barcelona. Thus, the contents of the buffer 260 from the thread 220 of the email application about Barcelona may still provide relevant string predictions 215 for both the web browsing application and the SMS application. By allowing the strings of a previous thread 220 to remain in the buffer 260, the candidate prediction generator 140 may continue to generate string predictions 215 based on the strings of the previous thread in a same or different application. In such an implementation, the buffer 260 may be cleared after some amount of time has passed (e.g., five minutes, ten minutes, one hour, one day, etc.), or after the buffer 260 is full.

Figure 3:
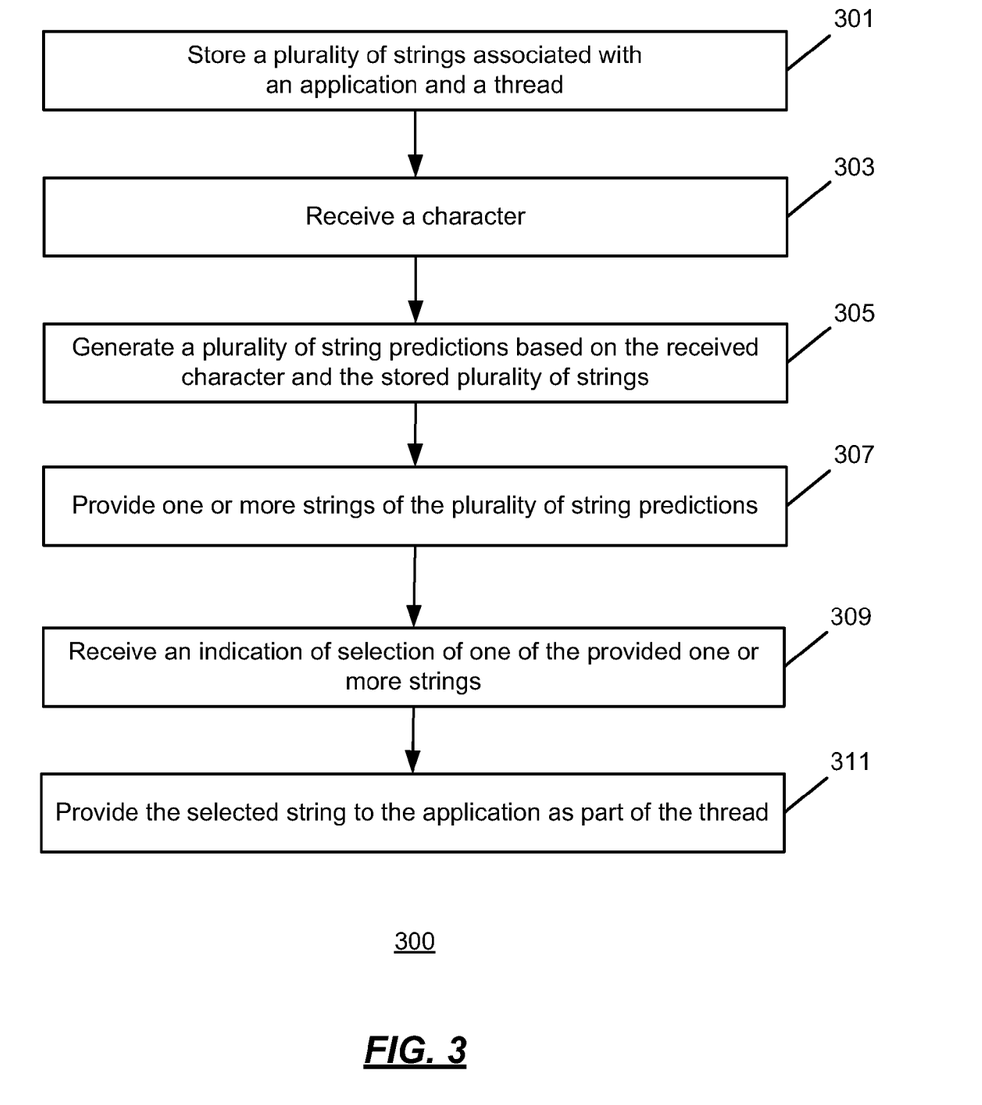
FIG. 3 is an operational flow of an implementation of a method for providing string predictions.

FIG. 3 is an operational flow of an implementation of a method 300 for providing string predictions. The method 300 may be implemented by a candidate prediction generator 140 of a computing device 115, for example.

A plurality of strings associated with an application and a thread are stored at 301. The plurality of strings may be stored in a buffer 260 by the candidate prediction generator 140. The application may be any of a variety of applications 135 including an SMS, email, or social networking application. The thread 220 may be a series of communications made between a user of the computing device 115 and one or more other users using the application. For example, the thread 220 may be a series of emails, text messages, or other communications made as part of a conversation between the user of the computing device and users of other computing devices 115. The plurality of strings may include the words, phrases, and sentences generated by the users in the communications that make up the thread 220.

In some implementations, the candidate prediction generator 140 may detect that the application is active, and may store the plurality of strings associated with a current thread 220 of the active application 135 in the buffer 260. For example, the candidate prediction generator 140 may receive an indication that the application 135 is active from the operating system 125.

A character is received at 303. The character may be received by the candidate prediction generator 140 from a user through the user interface 120 as the entered text 230. For example, the user may have entered a character into a text field using a software keyboard. The character may be part of the thread 220, and may be a prefix of the string that the user intends to provide to the application 135 as part of the thread 220.

A plurality of sting predictions is generated based on the received character and the stored plurality of strings at 305. The plurality of string predictions may comprise the string predictions 215 and may be generated by the candidate prediction generator 140 using the received character and the plurality of strings of the thread 220 from the buffer 260. In some implementations, the strings predictions 215 may each include a string from the plurality of strings, and may have been generated by determining strings from the plurality of strings that include the received character as a prefix. The string predictions 215 may further each include a confidence value that is based on the frequency of the string in the plurality of strings.

In some implementations, some of the plurality of string predictions 215 may also be generated by the candidate prediction generator 140 using the prediction model 205. The prediction model 205 may be a dictionary and may include a greater number of strings than the buffer 260.

One or more strings of the plurality of string predictions are provided at 307. The one or more strings may be provided according to the confidence values of the string predictions 215 by the candidate prediction generator 140. In some implementations, the strings of the string predictions 215 with the highest confidence values may be provided. The strings may be provided by displaying the strings in a soft input panel of the user interface 120, for example.

An indication of selection one of the provided one or more strings is received at 309. The indication of selection may be received by the operating system 125 from the user interface 120 and may be provided to the candidate prediction generator 140. For example, the user may select or touch one of the strings in the soft input panel of the user interface 120.

The selected string is provided as an input to the application as part of the thread at 311. The selected string may be provided to the application 135 as part of the thread 225 by the candidate prediction generator 140, for example.

In some implementations, the selected string may also be added to the buffer 260 by the candidate prediction generator 140. In addition, the string may be used to update the prediction model 205. For example, if the selected string exists in the prediction model 205, the probability or frequency associated with the string may be increased by the candidate prediction generator 140. If the selected string is not in the prediction model 205 it may be added by the candidate prediction generator 140.

Figure 4:
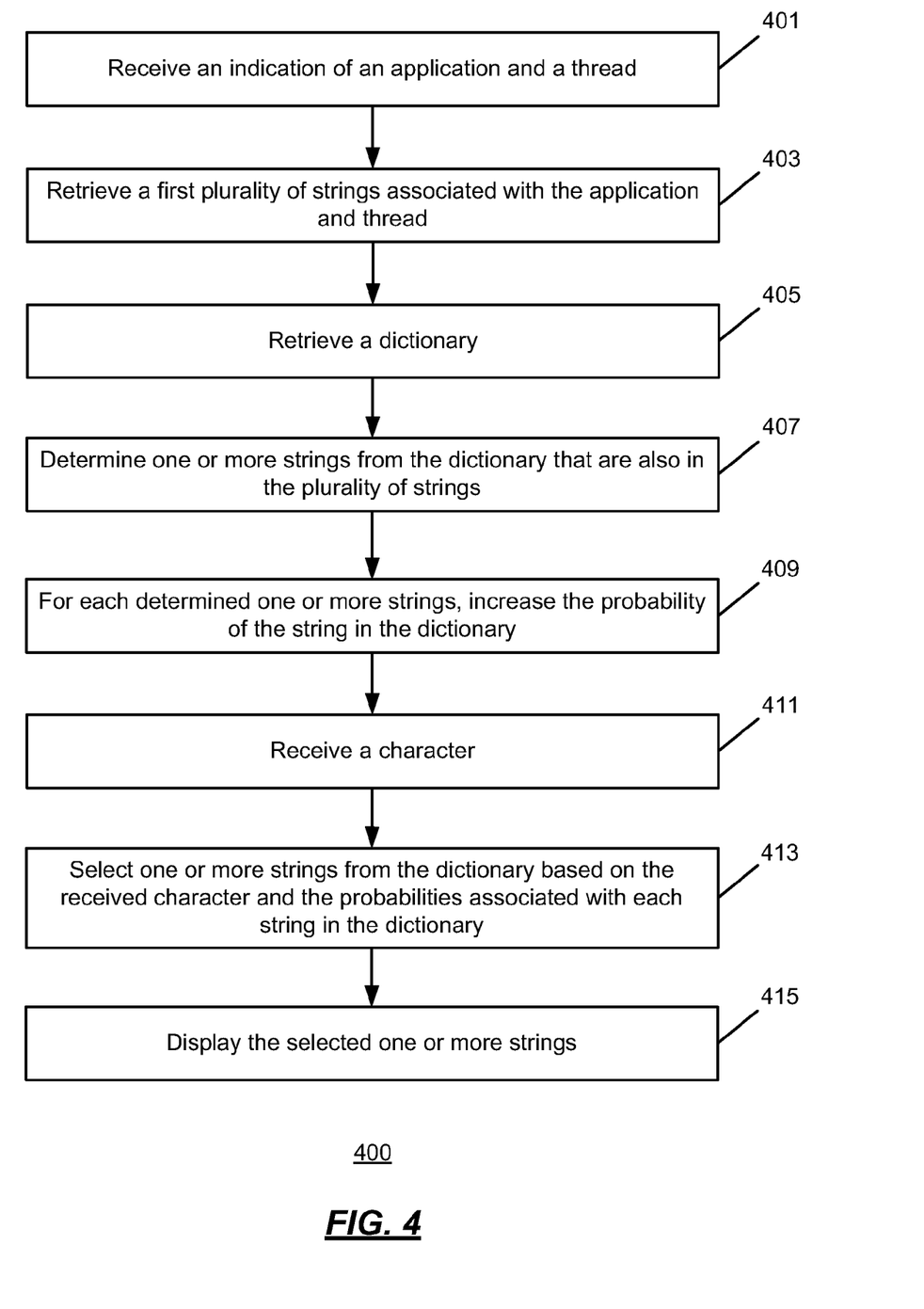
FIG. 4 is an operational flow of an implementation of a method for selecting and displaying one or more strings.

FIG. 4 is an operational flow of an implementation of a method 400 for selecting and displaying one or more strings. The method 400 may be implemented by the candidate prediction generator 140 of the computing device 115, for example.

An indication of an application and a thread are received at 401. The indication of an application 135 and a thread 220 may be received by the candidate prediction generator 140 from the operating system 125. The indication may be generated in response to a user opening the application 135, or otherwise making the application 135 active on the computing device 115. The thread 220 may be a current thread 220 of the application 135. For example, where the application 135 is an SMS application, the thread 220 may comprise a series of text messages sent from the user of the application 135 to another user.

A plurality of strings associated with the application and the thread are retrieved at 403. The plurality of strings may be retrieved by the candidate prediction generator 140. The plurality of strings may comprise the strings from the thread 220. The strings may be retrieved from a buffer 260 of the candidate prediction generator 140, or may be parsed from the thread 220 by the candidate prediction generator 140.

A dictionary is retrieved at 405 from storage. The dictionary may be retrieved by the candidate prediction generator 140. The dictionary may include a plurality of strings, and each string may have an associated probability that represents the frequency that the string appears in general usage. The dictionary may comprise the prediction model 205 in some implementations. The dictionary may comprise a global dictionary, or may be specific to the application 135. In some implementations, the received dictionary is a copy.

One or more strings from the dictionary that are also in the plurality of strings are determined at 407. The one or more strings from the dictionary may be determined by the candidate prediction generator 140 by matching one or more strings from the plurality of strings with the strings of the dictionary.

For each of the determined one or more stings, the probability of the string is increased in the dictionary at 409. The probability of the determined one or more strings may be increased by the candidate prediction generator 140. The increased probabilities may be permanent, or may be discarded when an indication that the application 135 has closed is received. Alternatively, the increased probabilities may be retained for some period of time after the application 135 has closed.

A character is received at 411. The character may be the entered text 230, and may be received by the candidate prediction generator 140 through a text box or other user interface 120 element. For example, a user may have entered the character into the text box using a soft keyboard.

One or more strings from the dictionary are selected based on the received character and the probabilities associated with each string in the dictionary at 413. The one or more strings may be selected by the candidate prediction generator 140, by selecting strings from the dictionary with the highest probability that have the received character as a prefix. The selected one or more strings along with their associated probabilities are the string predictions 215.

The selected one or more strings are displayed at 415. The selected one or more strings are displayed by the operating system 125 in a soft input panel of the user interface 120.

Figure 5:
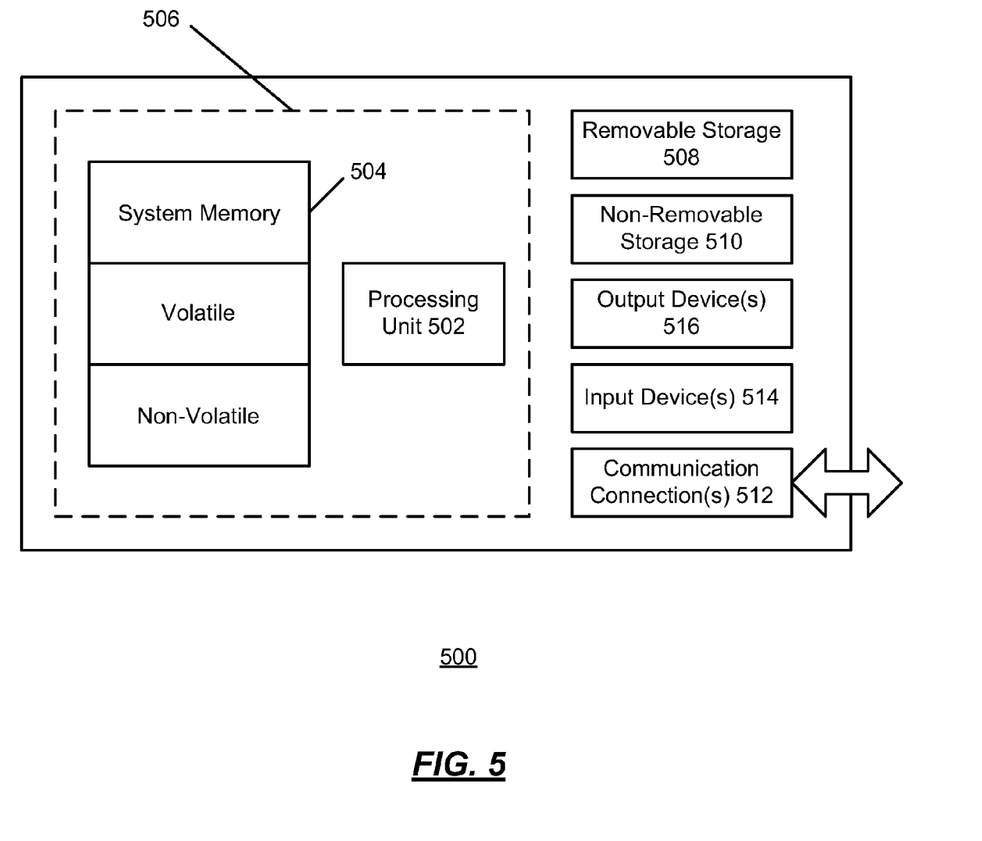
FIG. 5 shows an exemplary computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 1200. Any such computer storage media may be part of computing system 1200.

Computing system 500 may contain communication connection(s) 512 that allow the device to communicate with other devices and/or interfaces. Computing system 500 may also have input device(s) 514 such as a keyboard (software or hardware), mouse, pen, voice input interface, touch interface, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   storing a plurality of strings in a buffer by a computing device, wherein the plurality of strings are associated with a thread in a first application, wherein the thread is a current thread between a user of the computing device and at least one other user of another computing device, and wherein the current thread comprises a series of communications between the user and the at least one other user;
   receiving a first character by the computing device, wherein the received character is associated with the current thread in the first application;
   generating a first plurality of string predictions based on the received first character and the stored plurality of strings by the computing device, wherein each string prediction comprises a string from the stored plurality of strings;
   providing one or more of the strings of the first plurality of string predictions by the computing device;

receiving an indication of selection of one of the provided one or more strings of the first plurality of string predictions by the computing device;

in response to the indication of selection, providing the selected string to the first application as part of the current thread by the computing device;

determining that the first application is no longer active;

receiving a second character, wherein the second character is associated with a second application;

generating a second plurality of string predictions based on the received second character and the stored plurality of strings;

providing one or more strings of the second plurality of string predictions;

receiving an indication of selection of one of the provided one or more strings of the second plurality of string predictions;

in response to the indication of selection, providing the selected string to the second application; and clearing the buffer after a predetermined amount of time has passed.

2. The method of claim 1, wherein the first application comprises an SMS (short message service) application, an email application, or a social networking application.

3. The method of claim 1, wherein the first application is different than the second application, and further comprising receiving an indication that the first application of is no longer active.

4. The method of claim 1, further comprising when the predetermined amount of time has not passed and the buffer is full, then clearing the buffer.

5. The method of claim 1,
wherein each of the second plurality of string predictions comprises a string and a confidence value;
determining strings from the second plurality of string predictions that are also in the stored plurality of strings;
increasing the confidence value of the string predictions of the second plurality of string predictions that comprise the determined strings; and
providing one or more of the strings of the second plurality of string predictions according to the confidence values.

6. The method of claim 5, further comprising updating a prediction model based on the stored plurality of strings.

7. The method of claim 6, wherein the prediction model comprises a dictionary.

8. A method comprising:
retrieving a first plurality of strings from a buffer by a computing device, wherein the plurality of strings are associated with a thread, wherein the thread is a current thread between a user of the computing device and at least one other user of another computing device, and wherein the current thread comprises a series of communications between the user and the at least one other user;
retrieving a dictionary by the computing device, wherein the dictionary comprises a second plurality of strings and each string has an associated probability;
determining one or more strings from the second plurality of strings that is also in the first plurality of strings by the computing device;
for each determined one or more strings, increasing the probability associated with the string in the dictionary by the computing device;
receiving a character by the computing device, wherein the received character is associated with the current thread;
selecting one or more strings from the dictionary based on the received character and the probability associated with each of the second plurality of strings in the dictionary by the computing device;
displaying the selected one or more strings from the dictionary on a display of the computing device;
determining that the thread is no longer active;
receiving a second character by the computing device, wherein the received second character is associated with a second thread;
selecting one or more strings from the dictionary based on the received second character and the probability associated with each of the second plurality of strings in the dictionary by the computing device;
displaying the selected one or more strings from the dictionary on the display of the computing device; and
clearing the buffer after a predetermined amount of time has passed.

9. The method of claim 8, wherein the thread is different from the second thread, and further comprising clearing the buffer when the predetermined amount of time has not passed and the buffer is full.

10. The method of claim 8, wherein the thread comprises one or more of an SMS (short message service) message thread, an email thread, or a thread in a social networking application.

11. The method of claim 8, further comprising:
selecting one or more strings from the first plurality of strings based on the received character; and
displaying the selected one or more strings from the first plurality of strings on the display along with the selected one or more strings from the dictionary.

12. The method of claim 8, wherein increasing the probability associated with the string in the dictionary comprises temporarily increasing the probability associated with the string in the dictionary.

13. The method of claim 8, further comprising:
detecting an application associated with the thread, and
in response to the detection, retrieving the first plurality of strings.

14. The method of claim 13, further comprising:
receiving an indication of selection of one of the displayed one or more strings; and
in response to the indication of selection, providing the selected displayed string to the application as part of the thread.

15. The method of claim 14, further comprising adding the selected displayed string to the first plurality of strings.

16. The method of claim 14, further comprising increasing the probability associated with the selected displayed string in the dictionary.

17. A system comprising:
at least one computing device;
a display;
a buffer; and
a candidate prediction generator adapted to:
receive an indication of a first application and a thread, wherein the thread is a current thread between a user of the at least one computing device and at least one other user of another computing device, and wherein the current thread comprises a series of communications between the user and the at least one other user;
store a plurality of strings associated with the current thread and the first application in the buffer;
receive a character associated with the current thread and the first application;
generate a plurality of string predictions based on the received character and the stored plurality of strings in the buffer, wherein each string prediction comprises a string from the stored plurality of strings;

display one or more of the strings of the plurality of string predictions on the display; and upon receiving an indication that the first application is no longer active, receive a second character, wherein the second character is associated with a second application;

generate a second plurality of string predictions based on the received second character and the stored plurality of strings;

provide one or more strings of the second plurality of string predictions; and clear the buffer after a predetermined amount of time has passed or after the buffer is full.

18. The system of claim 17, wherein the candidate prediction generator is further adapted to update a prediction model based on the stored plurality of strings.

19. The system of claim 17, wherein the application comprises at least one of an SMS (short message service) application, a social networking application, or an email application.

20. The system of claim 17, wherein the candidate prediction generator is further adapted to:

receive an indication of selection of one of the provided one or more strings of the second plurality of string predictions; and in response to the indication of selection, provide the selected string to the second application.

* * * * *